United States Patent
Büchel et al.

(10) Patent No.: US 12,209,688 B2
(45) Date of Patent: Jan. 28, 2025

(54) VALVE PLATE FOR A CLOSURE DEVICE FOR CLOSING AN OPENING IN A WALL IN A VACUUM-TIGHT MANNER

(71) Applicant: VAT Holding AG, Haag (CH)

(72) Inventors: Fabian Büchel, Buchs SG (CH); Philipp Wohlwend, Vaduz (LI)

(73) Assignee: VAT Holding AG, Haag (CH)

( * ) Notice: Subject to any disclaimer, the term of this patent is extended or adjusted under 35 U.S.C. 154(b) by 0 days.

(21) Appl. No.: 18/273,329

(22) PCT Filed: Jan. 26, 2022

(86) PCT No.: PCT/EP2022/051664
§ 371 (c)(1),
(2) Date: Jul. 20, 2023

(87) PCT Pub. No.: WO2022/161966
PCT Pub. Date: Aug. 4, 2022

(65) Prior Publication Data
US 2024/0093787 A1 Mar. 21, 2024

(30) Foreign Application Priority Data
Feb. 1, 2021 (DE) .......................... 102021102284.3

(51) Int. Cl.
*F16K 51/02* (2006.01)
*F16K 1/36* (2006.01)
(Continued)

(52) U.S. Cl.
CPC ............... *F16K 51/02* (2013.01); *F16K 1/36* (2013.01); *F16K 1/48* (2013.01); *F16K 1/34* (2013.01); *F16K 2200/101* (2021.08)

(58) Field of Classification Search
CPC ... F16K 51/02; F16K 1/48; F16K 1/34; F16K 1/36; F16K 2200/101; F16K 2200/10; F16K 31/122
See application file for complete search history.

(56) References Cited

U.S. PATENT DOCUMENTS 2,848,187 A * 8/1958 Henry ........................ F16K 1/20
251/86
3,344,807 A * 10/1967 Lehrer .................... F16K 51/02
137/614.19
(Continued)

FOREIGN PATENT DOCUMENTS

CH    694279 A5 * 10/2004  ............... F16K 1/48
CH    699258      2/2010
(Continued)

OTHER PUBLICATIONS

VAT Vakuumventile AG, Construction plans of a vacuum valve (Apr. 4, 2007).
(Continued)

*Primary Examiner* — David Colon-Morales
(74) *Attorney, Agent, or Firm* — Volpe Koenig

(57) ABSTRACT

A valve plate for a closure device for closing an opening in a vacuum-tight manner. A front side of the valve plate has a seal ring for sealing to the wall, and the rear side has a depression for connecting to a valve rod. In regions of two mutually opposite lateral walls of the depression, an extension adjoins in each depression. For each respective extension a threaded bore is present, which on a lateral wall thereof opens into the extension. The valve rod is connectable to the valve plate by a respective retaining bolt screwed into the respective threaded bore and via an end portion that protrudes from the threaded bore into the extension, with the end portion interacting with a groove on a connecting part
(Continued)

connected to the valve rod end, or at the valve rod end is configured integral to the latter.

15 Claims, 6 Drawing Sheets

(51) Int. Cl.
*F16K 1/48* (2006.01)
*F16K 1/34* (2006.01)

(56) References Cited

U.S. PATENT DOCUMENTS

| | | | |
|---|---|---|---|
| 3,837,617 A | 9/1974 | Eminger et al. | |
| 4,071,011 A * | 1/1978 | Oertle | F16K 1/02 137/317 |
| 4,742,845 A | 5/1988 | Capoccia et al. | |
| 5,226,632 A * | 7/1993 | Tepman | H01L 21/67126 137/315.27 |
| 5,363,872 A | 11/1994 | Lorimer | |
| 5,385,334 A * | 1/1995 | Greenwood | F16K 1/10 251/332 |
| 5,738,333 A * | 4/1998 | Cognevich | F16K 17/105 137/489.5 |
| 6,032,419 A * | 3/2000 | Hurwitt | H01L 21/67126 137/1 |
| 6,698,719 B2 * | 3/2004 | Geiser | F16K 1/46 251/332 |
| 6,796,545 B2 * | 9/2004 | Enzaki | F16K 25/00 251/363 |
| 6,805,152 B2 * | 10/2004 | Kanzaka | F16K 31/122 137/341 |
| 7,007,919 B2 | 3/2006 | Blonigan et al. | |
| 7,134,642 B2 | 11/2006 | Seitz | |
| 7,168,676 B2 * | 1/2007 | Kajitani | F16K 31/1225 251/285 |
| 7,396,001 B2 | 7/2008 | Geiser | |
| 7,401,760 B2 * | 7/2008 | Kanzaka | F16K 1/48 251/63 |
| 7,658,367 B2 | 2/2010 | Geiser | |
| 7,798,467 B2 * | 9/2010 | Sakurai | F16K 51/02 251/63.5 |
| 8,196,893 B2 * | 6/2012 | Grout | F16K 15/148 251/63 |
| 8,424,843 B2 | 4/2013 | Ehrne | |
| 9,206,919 B2 * | 12/2015 | Neumeister | F16K 27/02 |
| 10,072,760 B2 * | 9/2018 | Kajio | F16K 1/42 |
| 10,260,655 B2 * | 4/2019 | Kim | F16K 1/48 |
| 10,571,029 B2 * | 2/2020 | Kajio | F16K 1/36 |
| 10,876,639 B2 | 12/2020 | Shimoda et al. | |
| 10,895,331 B2 * | 1/2021 | Enzaki | F16K 1/523 |
| 11,326,699 B2 * | 5/2022 | Blecha | F16K 3/314 |
| 11,506,294 B2 * | 11/2022 | Sato | F16K 41/12 |
| 2002/0033462 A1 * | 3/2002 | Kajitani | F16K 1/38 251/118 |
| 2002/0130288 A1 | 9/2002 | Duelli | |
| 2002/0134441 A1 * | 9/2002 | Kusumoto | F16K 51/02 137/625.3 |
| 2006/0011140 A1 | 1/2006 | Blahnik et al. | |
| 2007/0007475 A1 * | 1/2007 | Zvokelj | F16K 31/122 251/63.6 |
| 2011/0108750 A1 | 5/2011 | Ehrne et al. | |
| 2012/0267556 A1 | 10/2012 | Shimoda et al. | |
| 2012/0298899 A1 | 11/2012 | Geiser et al. | |
| 2018/0156339 A1 | 6/2018 | Kim et al. | |
| 2020/0096133 A1 | 3/2020 | Zickar | |
| 2020/0318235 A1 | 10/2020 | Kollberg et al. | |
| 2021/0231223 A1 | 7/2021 | Blecha | |
| 2024/0093789 A1 | 3/2024 | Boyd et al. | |

FOREIGN PATENT DOCUMENTS

| | | | | |
|---|---|---|---|---|
| DE | 102006016510 A1 * | 11/2006 | | F16K 1/48 |
| DE | 102011102990 A1 | 4/2012 | | |
| DE | 102011100218 A1 * | 11/2012 | | F16K 1/34 |
| DE | 102015213298 A1 * | 1/2017 | | |
| EP | 0453857 | 10/1991 | | |
| EP | 0453867 A1 | 10/1991 | | |
| EP | 1197993 A1 | 4/2002 | | |
| EP | 2146122 | 1/2010 | | |
| EP | 3287681 A1 * | 2/2018 | | F16K 1/126 |
| JP | S6376918 A | 4/1988 | | |
| KR | 200476559 Y1 * | 3/2015 | | |
| KR | 20180021561 A * | 3/2018 | | |
| WO | WO-0074124 A1 * | 12/2000 | | C23C 16/54 |
| WO | 2011/091455 A1 | 8/2011 | | |
| WO | 2022/161909 A1 | 8/2022 | | |

OTHER PUBLICATIONS

German Office Action issued on Jan. 19, 2022 for German Patent Application No. 10 2021 102 284.3 (with English translation of Result of the document search).

\* cited by examiner

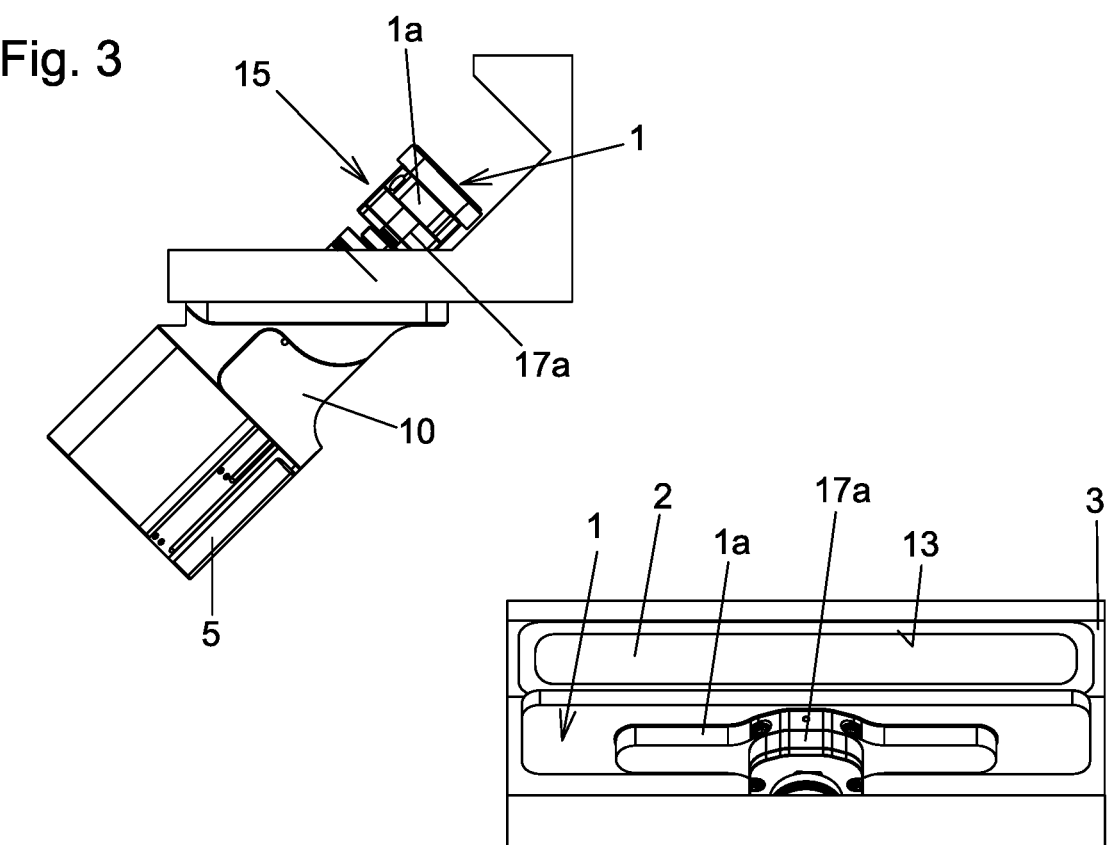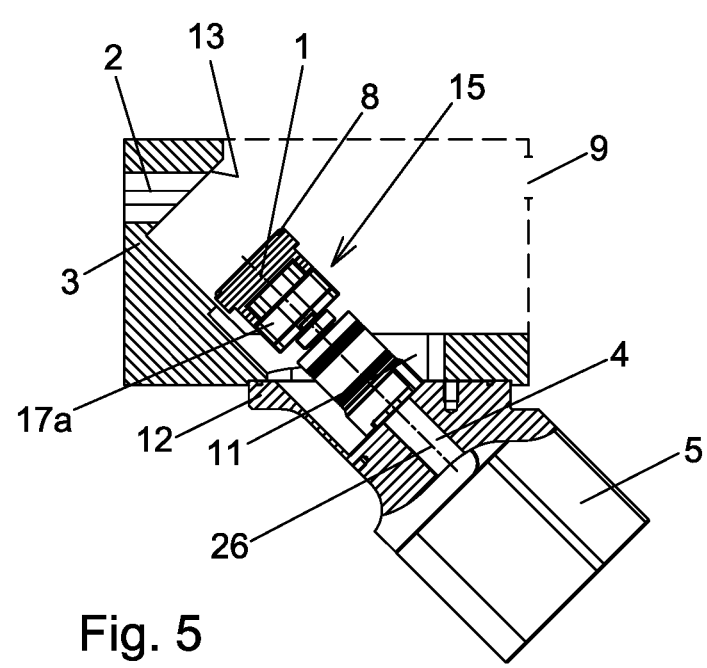

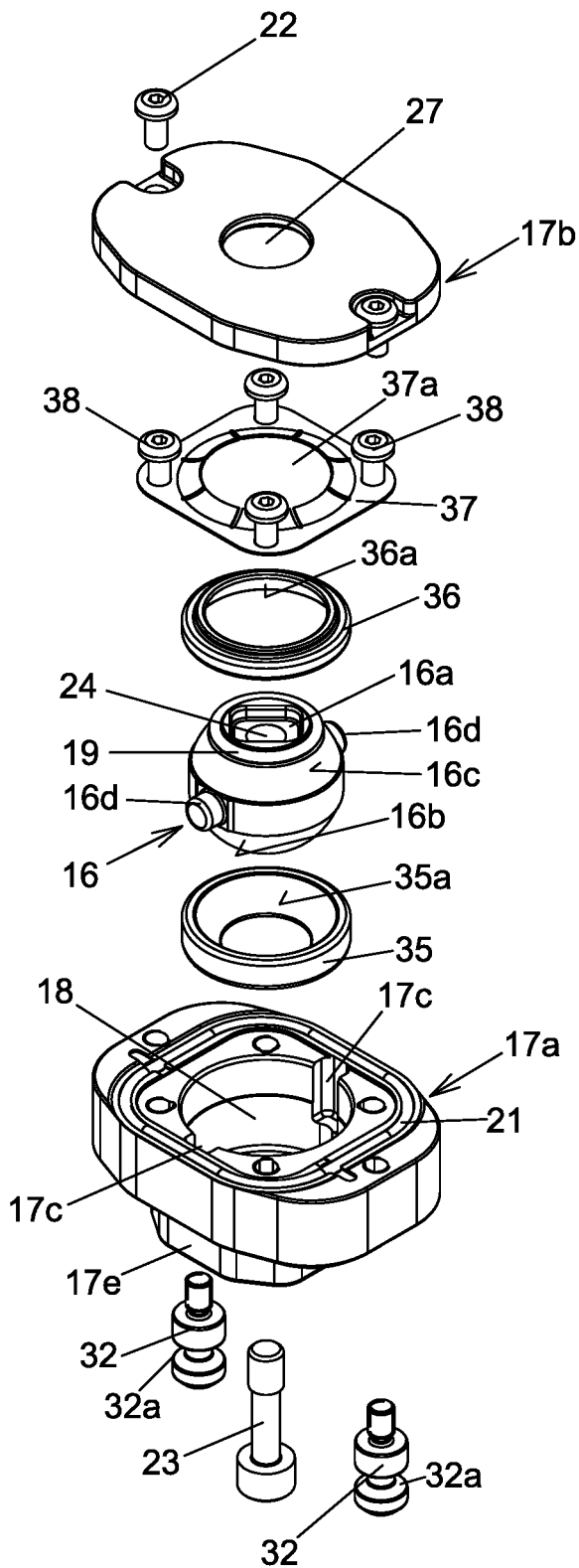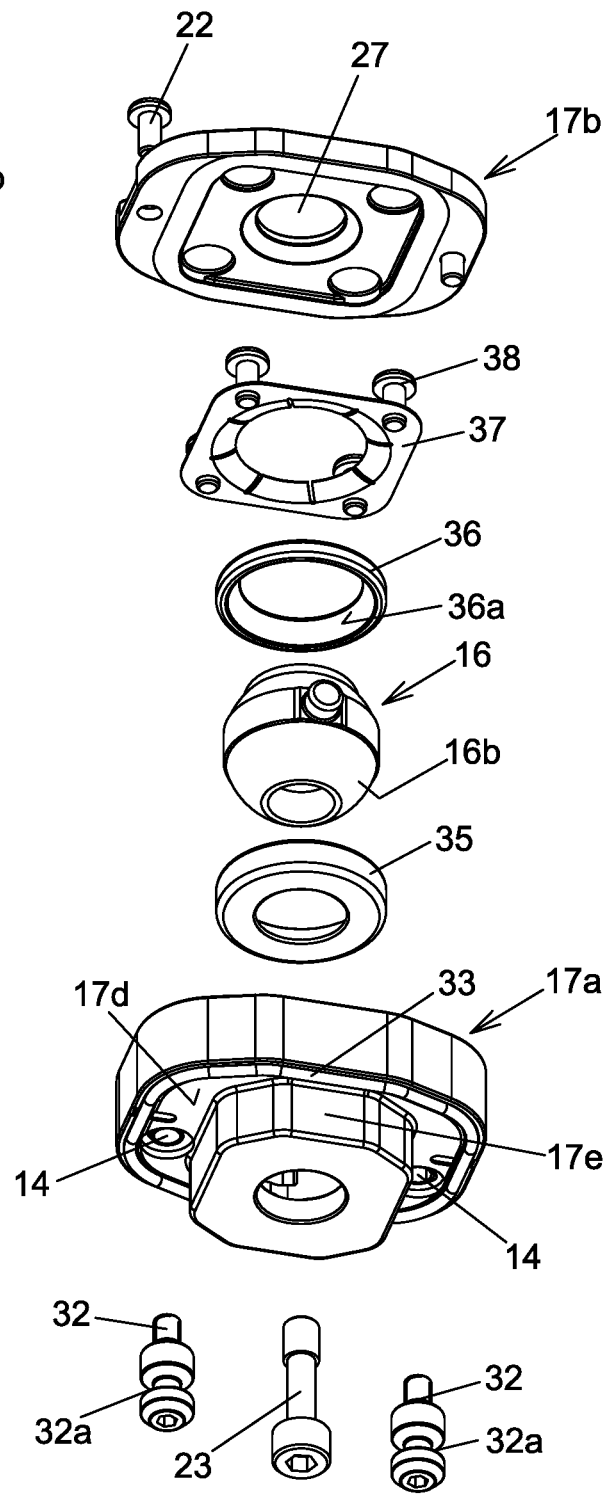

VALVE PLATE FOR A CLOSURE DEVICE FOR CLOSING AN OPENING IN A WALL IN A VACUUM-TIGHT MANNER

CROSS-REFERENCE TO RELATED APPLICATION

This application is the U.S. National Phase of PCT Appln. No. PCT/EP2022/051664, filed Jan. 26, 2022, which claims priority from German Patent Application No. 10 2021 102 284.3, filed Feb. 1, 2021, the entire disclosures of which are incorporated by reference herein.

TECHNICAL FIELD

The invention relates to a valve plate for a closure device for closing an opening in a wall in a vacuum-tight manner, wherein the valve plate on its front side has a seal ring for sealing in relation to the wall, and on its rear side has a depression for connecting to a valve rod of the closure device. Furthermore, the invention relates to a closure device having such a valve plate which is connected to a valve rod of the closure device.

BACKGROUND

A closure device for closing an opening in a wall in a vacuum-tight manner can be configured in particular in the form of a vacuum valve which has a valve housing in which the valve plate is disposed. One of the walls of the valve housing here has the opening that can be closed by the valve plate, and another wall of the valve housing has a further opening in order to form a passage through the valve housing when the vacuum valve is in the open state. A further possibility for designing a closure device for closing an opening in a wall in a vacuum-tight manner consists in a vacuum door, by which an opening in a vacuum chamber is closed off from the outside space surrounding the vacuum chamber (whereby a vacuum door may also be considered to be a type of vacuum valve). Here, an opening that can be closed by the valve plate can be disposed directly in the wall of a vacuum chamber to which the closing device is attached. The wall in this instance is thus not part of the closure device.

Vacuum valves and vacuum doors may require the valve plate to be serviced from time to time, particularly due to wear and tear of the seal ring which is disposed thereon and serves to seal in relation to a seal face disposed on the wall. This wear and tear is relatively high, particularly when aggressive process gases are used, such as those used in the semiconductor industry, for example. In order to service the valve plate, the latter must be able to be removed from the valve rod. For this purpose, a threaded connection is usually provided between the valve rod and the valve plate.

For instance, EP 0 453 867 B1 shows a vacuum valve in which a connecting device, via which the valve plate is connected to the valve rod, is screwed to the back of the valve plate. The connecting device here has mobility both about an axis parallel to the longitudinal extension of the valve plate and about an axis orthogonal to the longitudinal extension of the valve plate, in order to achieve uniform compression of the elastic seal ring disposed on the front side of the valve plate, despite there being tolerances in the closed state of the vacuum valve.

Also known from previous use is a vacuum valve in the form of a angle valve in which one end of the valve rod has an external thread with which the valve rod is screwed directly into a threaded blind bore configured on the rear side of the valve plate. Here, there is no ability for the valve plate to move relative to the valve rod.

Further connecting devices between a valve plate and a valve rod, which allow the valve plate to move relative to the valve rod, are disclosed in U.S. Pat. No. 7,134,642 B2 and U.S. Pat. No. 3,837,617. The valve plates shown therein on one of their narrow sides have an opening in order to receive an end portion of the valve rod and/or parts of the connecting device.

In industrial vacuum processes, it is usually desirable for the vacuum components used to release as few particles as possible into the vacuum in order not to compromise the quality of the vacuum process. However, in the case of parts moving relative to one another in a sliding manner, many particles are generated and released.

SUMMARY

The object of the invention is to provide an advantageous valve plate of the type mentioned at the outset, which can be connected to the valve rod and removed from the valve rod in a simple and reliable manner, wherein the connection can be made directly to the valve rod or via a connecting device connected to the valve rod. According to the invention, this is achieved by a valve plate having one or more of the features described herein.

In the valve plate according to the invention, at least in regions of two mutually opposite lateral walls of the depression, an extension adjoins in each case the depression disposed on the rear side of the valve plate lying opposite the front side. For each respective extension a threaded bore is configured in the valve plate, which on a lateral wall of the respective extension opens into the extension. The valve plate can be connected to the valve rod by means of a respective retaining bolt which is screwed into the respective threaded bore and protrudes with an end portion out of the threaded bore into the extension, specifically by the end of the respective retaining bolt interacting with a groove which is disposed on a connecting part that is connected to the end of the valve rod, or at the end of the valve rod is configured so as to be integral to the latter. For releasing the valve plate from the valve rod, the retaining bolts can thus be turned until their end portions disengage from the groove or respective groove.

Favorably, said threaded bores in the valve plate extend parallel to the plane in which the valve plate lies. In particular, they are disposed at an angle of more than 45°, preferably at an angle of 90°, in relation to the longitudinal extent of the valve plate.

The dimensions of the extensions of the depression, measured in all directions parallel to the plane in which the valve plate lies, are expediently smaller than the dimensions of the depression (without these extensions) measured in the corresponding directions. Proceeding from the depression of the valve plate, the extensions preferably extend in directions which are facing away from one another and lie parallel to the longitudinal extent of the valve plate.

Advantageously, the valve plate has a seal face, or such a seal, surrounding the depression having the extensions. This seal face or seal can thus be used for sealing between the valve plate and a connecting piece which is connected to the end of the valve rod, or at the end of the valve rod is configured so as to be integral to the latter, and from which the at least one connecting part projects. The interior of the depression having the extensions can thus be sealed in relation to the surrounding space, which represents, for example, the interior of a valve housing. If particles are formed during the relative sliding movement between parts disposed in the depression of the valve plate, these particles can be prevented from escaping from this interior by the seal.

A closure device according to the invention has a valve plate according to the invention, which is connected to the valve rod of the closure device, wherein the retaining bolts engage in the at least one groove disposed on the at least one connecting part.

Preferably, a connecting piece from which the at least one connecting part projects is releasably connected to the end of the valve rod. In particular, mobility can be provided between the connecting piece and the valve rod. The connecting piece can thus be part of a connecting device disposed between the valve plate and the valve rod. In principle, however, it would also be conceivable and possible for the connecting piece to be configured so as to be integral to the end of the valve rod.

The connecting piece favorably has an appendage which protrudes into the depression in the valve plate, wherein an anti-rotation safeguard is configured between the appendage and the valve plate. This can be achieved in particular in that the appendage of the connecting piece has a circumferential contour that deviates from the circular shape and interacts with a corresponding circumferential contour of the depression.

The or the respective groove, in which the end portion of the respective retaining bolt engages (when viewed in a section running parallel to the longitudinal extent of the respective retaining bolt and through its longitudinal central axis) advantageously has an inclined surface which interacts with the conically converging end portion of the respective retaining bolt. As a result, when the retaining bolts are connected to the at least one connecting part, the connecting piece is pressed against the valve plate. This results in a stable connection in which an annular seal between the connecting piece and the valve plate, which surrounds the depression with the extensions, is also able to be compressed.

BRIEF DESCRIPTION OF THE DRAWINGS

Further advantages and details of the invention will be explained hereunder with reference to the appended drawing, in which:

FIGS. 3 and 4 show a lateral view and a view of the closure device in the opened position of the valve plate;

FIG. 5 shows a section along the line A-A of FIG. 4;

FIGS. 18 and 19 show exploded views of the connecting device viewed from different directions.

DETAILED DESCRIPTION

The figures have different scales and are in part shown in a simplified manner.

An exemplary embodiment of the invention will be explained hereunder with reference to FIGS. 1 to 19.

Figure 1:
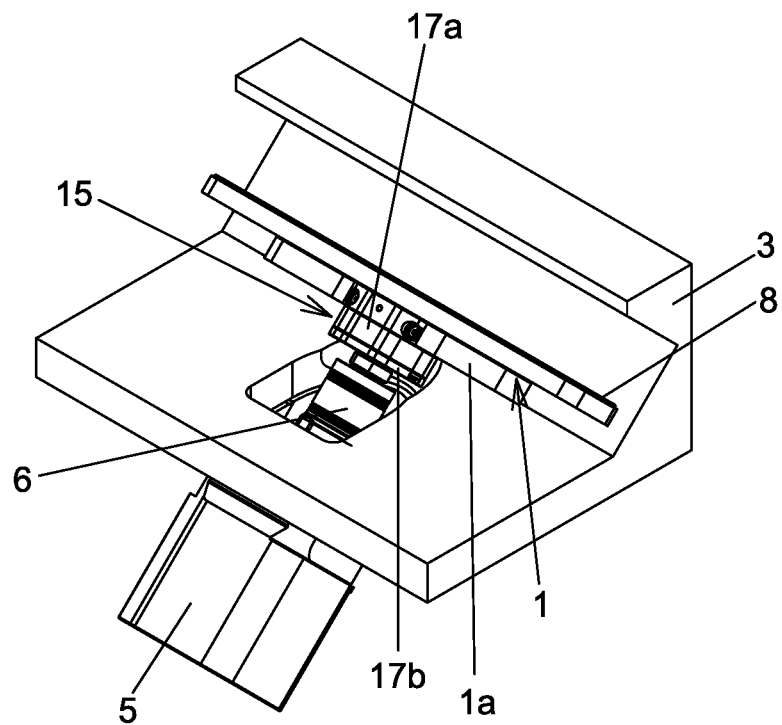
FIG. 1 shows an oblique view of part of a closure device having a valve plate according to the invention, in the opened position of the valve plate.
Figure 2:
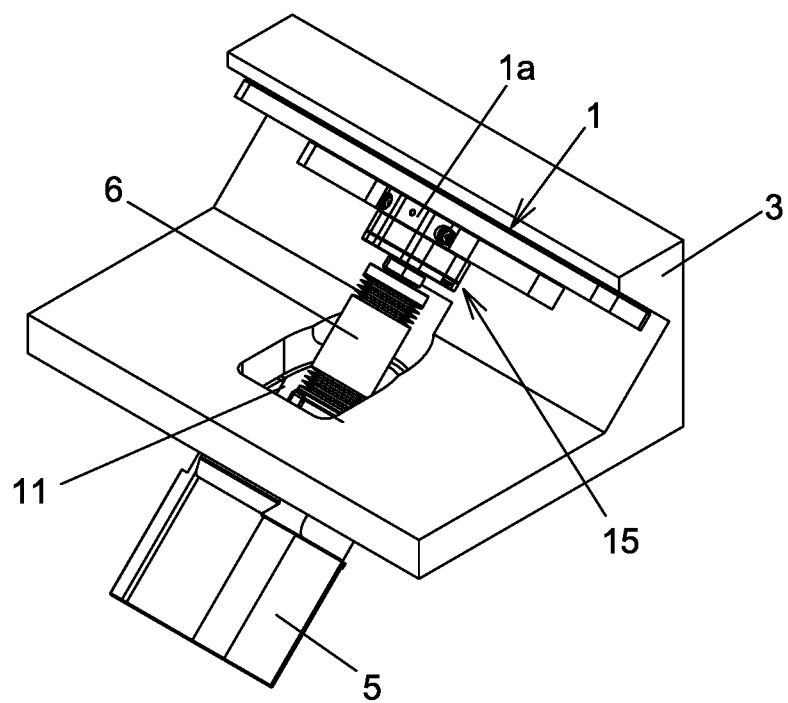
FIG. 2 shows an oblique view analogous to that of FIG. 1, in the closed position of the valve plate.
Figure 6:
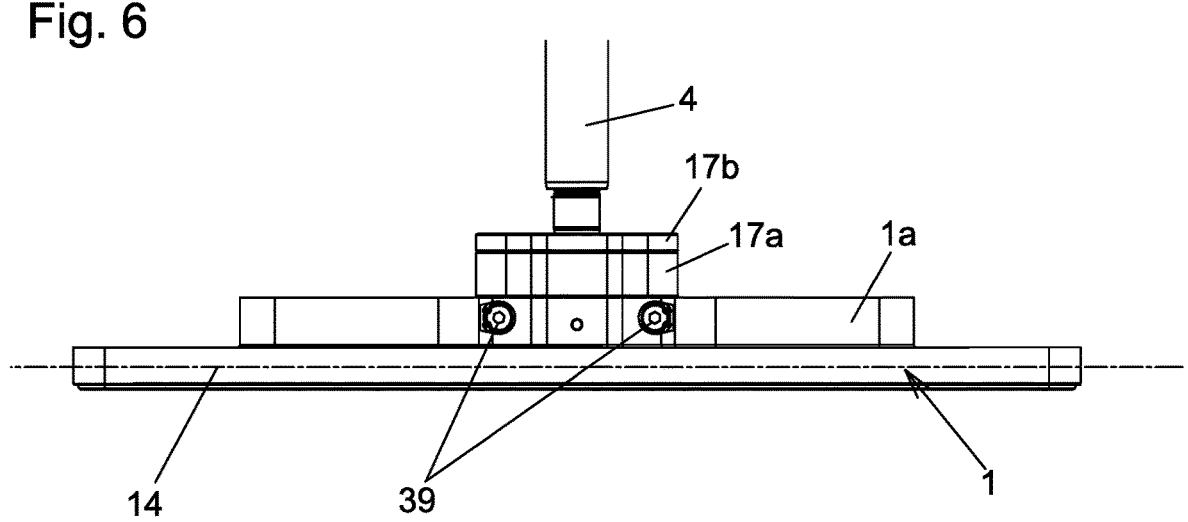
FIG. 6 shows a lateral view of the front end of the valve rod, with the valve plate connected to the valve rod via the connecting device.
Figure 8:
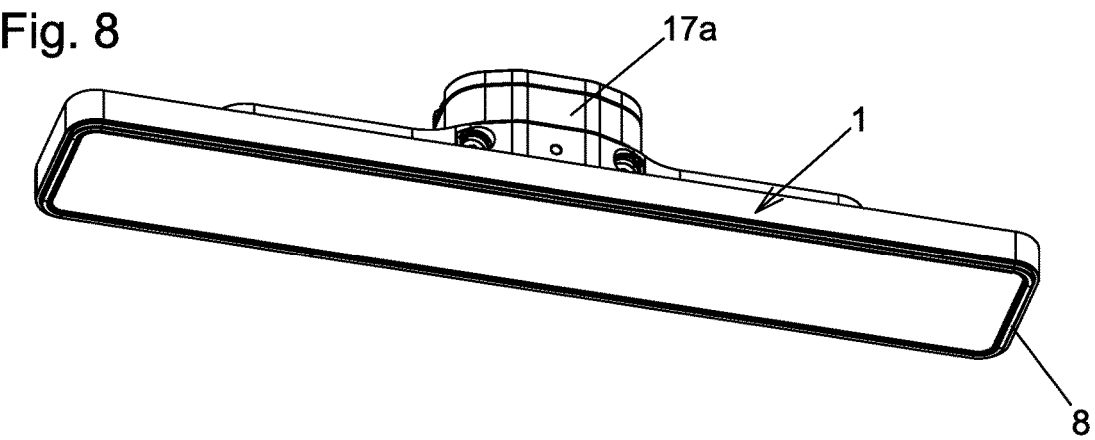
FIG. 8 shows an oblique view from a different direction than in FIG. 7.
Figure 7:
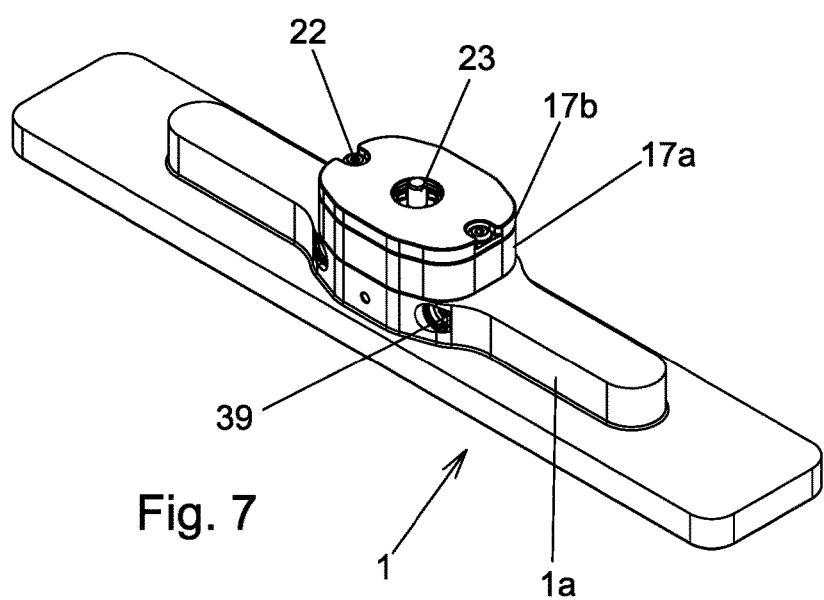
FIG. 7 shows an oblique view of the valve plate with the connecting device connected to the latter.
Figure 9:
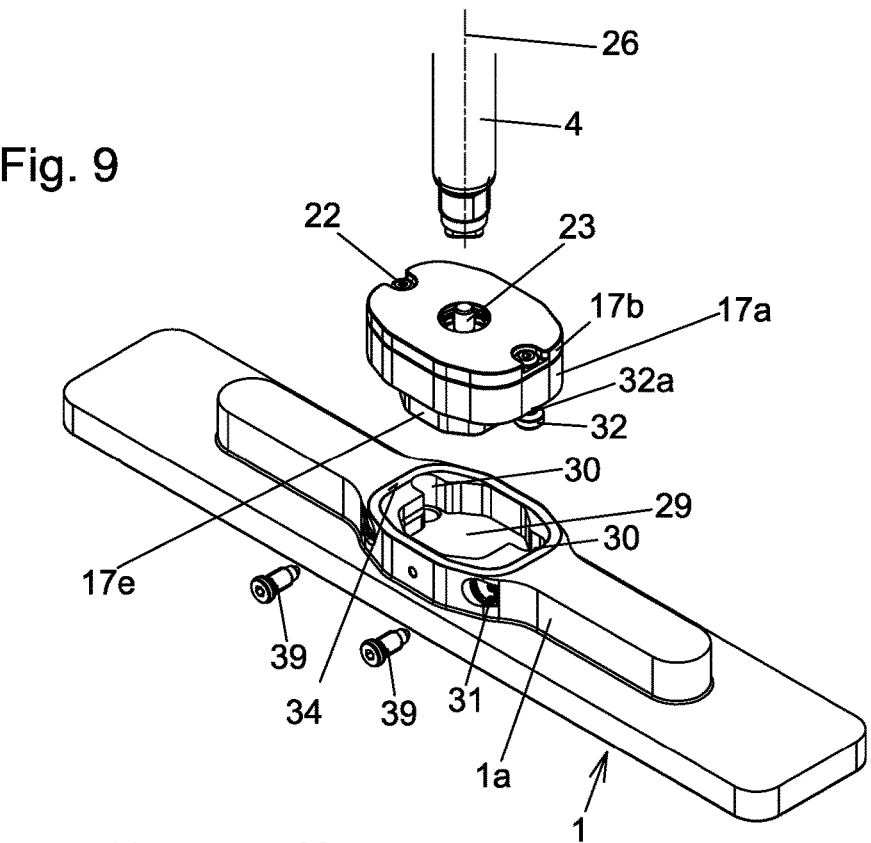
FIG. 9 shows an oblique view of the front end of the valve rod, the connecting device and the valve plate, in the disassembled state of these parts.
Figure 12:
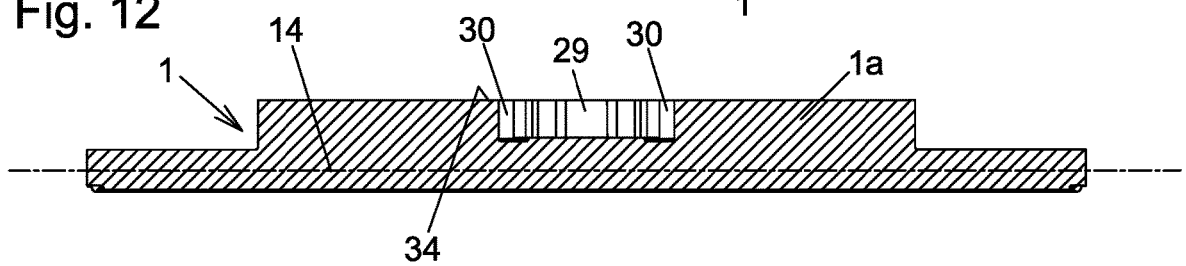
FIG. 12 shows a section along the line B-B of FIG. 10.
Figure 11:
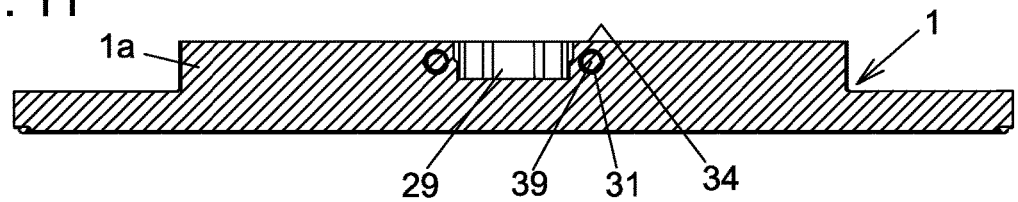
FIG. 11 shows a section along the line A-A of FIG. 10.
Figure 10:
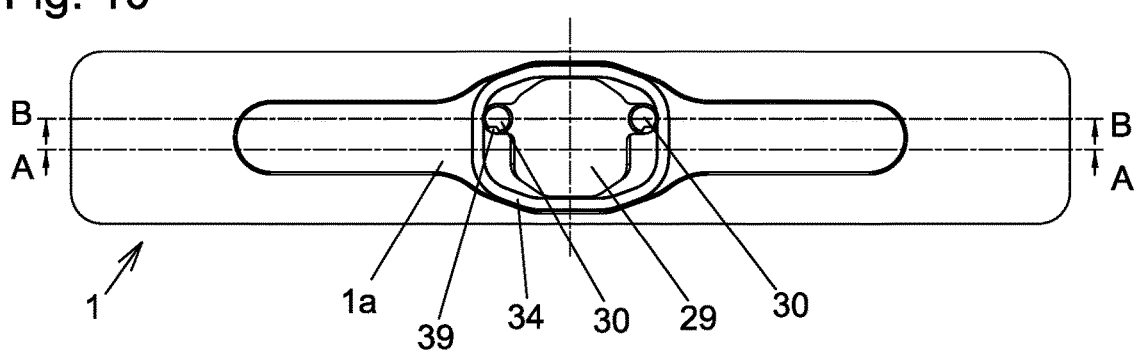
FIG. 10 shows a plan view of the rear side of the valve plate.
Figure 15:
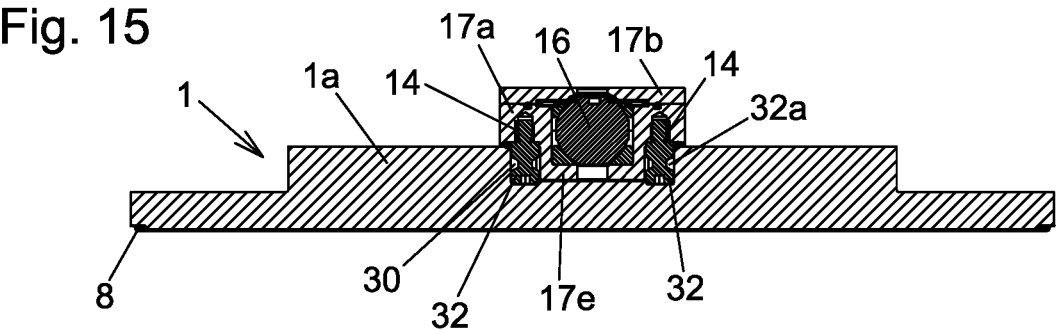
FIG. 15 shows a section along the line D-D of FIG. 13.
Figure 14:
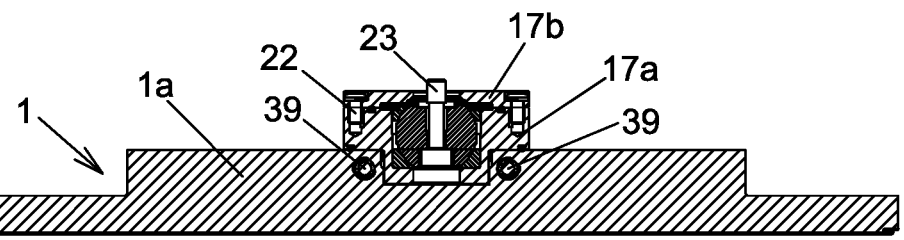
FIG. 14 shows a section along the line C-C of FIG. 13.
Figure 13:
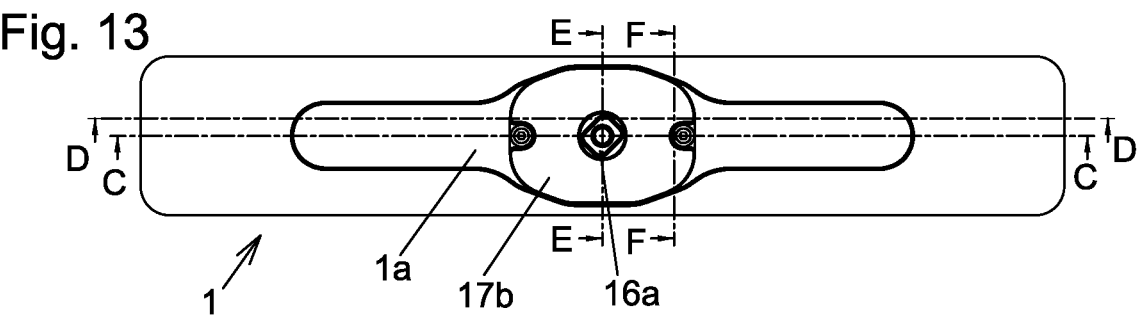
FIG. 13 shows a plan view of the rear of the valve plate, with the connecting device connected to the valve plate.
Figure 16:
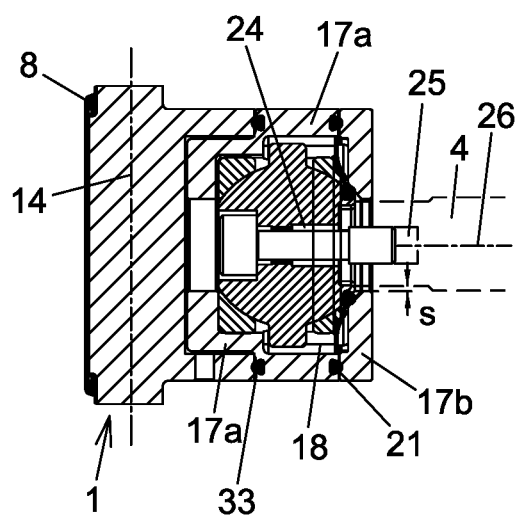
FIG. 16 shows a section along the line E-E of FIG. 13.
Figure 17:
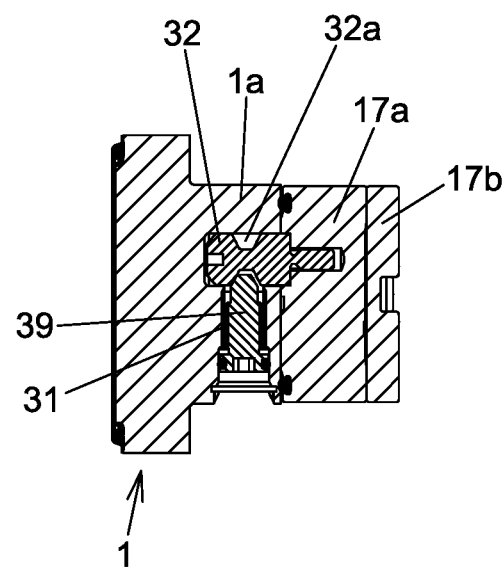
FIG. 17 shows a section along the line F-F of FIG. 13.

Shown by way of example in the figures is a closure device which has the valve plate 1 that can be adjusted between an opened position (FIG. 1) and a closed position (FIG. 2). In the opened position of the valve plate, an opening 2 in a wall 3 is exposed; in the closed position the opening 2 is closed by the valve plate 1 in a vacuum-tight manner.

Closing in a vacuum-tight manner is understood to mean a leakage rate Q of at least less than $10^{-4}$ mbar l/s.

The valve plate 1 is supported by a valve rod 4 having a longitudinal axis 26. In the exemplary embodiment, the valve plate 1 is adjusted between the opened position and the closed position simply by an axial adjustment of the valve rod 4.

A drive 5, which in the exemplary embodiment is formed by pneumatic piston-and-cylinder unit serves for adjusting the valve rod 4, so as to adjust the valve plate 1 between the opened position and the closed position. The valve rod 4 is connected to the piston rod of this piston-and-cylinder unit or is configured so as to be integral to the latter.

A seal ring 8 from an elastomer material, which is attached to the front side of the valve plate 1, serves for sealing between the valve plate 1 and the wall 3 when the closure device is in the closed state. The opening 2 in the wall 3 is surrounded by a seal face 13 which forms the seal seat on which the seal ring 8 bears when the valve plate 1 is in the closed position.

The seal ring 8 can be disposed in a groove on the front side of the valve plate 1 and be held in it, or said seal ring 8 can be vulcanized onto the front side of the valve plate 1.

The wall 3 can be part of a valve housing, which is only partially illustrated in each of FIGS. 1 to 4. The remaining part of the valve body is indicated in FIG. 5 by dashed lines. This valve housing thus has an interior in which the valve plate 1 is disposed. Moreover, such a valve housing has a second opening 9, also indicated in FIG. 5, for example opposite the opening 2, in order to form a passage through the valve housing when the valve plate 1 is in the opened position. In this exemplary embodiment, the closure device thus also comprises the valve housing having the wall 3 with the opening 2, and forms a vacuum valve.

The valve housing has a further opening 11 through which the valve rod 4 is guided out of the interior of the valve housing. This opening 11 is closed in a vacuum-tight manner by a connector piece 10 to which the drive 5 is attached, whereby the valve rod 4 penetrates a passage duct through the connector piece 10 and is axially guided by the latter. An annular seal 12 serves for sealing between the valve housing and the connector piece 10. In the exemplary embodiment, a bellows 6 serves for sealing the valve rod 4 in relation to the passage duct through the connector piece 10. Instead of a bellows, a slide ring seal with at least one seal ring could also be provided for sealing.

In a modified embodiment, the closure device, which is configured as shown in FIGS. 1 to 4, thus configured as in FIG. 5 without the dashed lines, could also be attached to the outside of a wall of a vacuum chamber, whereby the opening 2 is co-aligned with an opening in this wall of the vacuum chamber and the wall 3 in the region surrounding the opening 2 is sealed in relation to the wall of the vacuum chamber. In such an application, the closure device could also be referred to as a door.

In yet another embodiment, the wall 3 having the opening 2 could also be part of a vacuum chamber. This vacuum chamber thus possesses a further opening, corresponding to the opening 11 illustrated in the figures, through which the valve rod 4 is guided out of the interior of the vacuum chamber and which is closed by the connector piece 10, the drive 5 in turn being attached to the connector piece and the valve rod extending through a passage duct in the connector. The valve rod can in turn be guided into the vacuum region of the vacuum chamber in a sealed manner by means of a bellows (or by means of a slide ring seal). The wall 3 having the opening 2 is therefore not part of the closure device in this embodiment.

The valve plate 1 is configured with a substantially rectangular circumferential contour. "Substantially rectangular" here means that the valve plate is configured so as to be rectangular with rounded corners.

The opening 2 possesses a corresponding contour.

The valve plate 1 lies in a plane 14, which could also be referred to as the central plane or main plane of the valve plate. The seal ring 8 extends parallel to this plane 14.

On the rear side of the valve plate 1, which is opposite the front side of the valve plate 1 on which the seal ring 8 is disposed, the valve plate has a projecting portion 1a in which a depression 29 is disposed, as will be explained in more detail below.

In the exemplary embodiment, the valve rod 4 is connected to the valve plate 1 by means of a connecting device 15 which enables mobility between the valve plate 1 and the valve rod 4. For this purpose, the connecting device 15 has a swivel head 16, which is rigidly connected to the valve rod 4 and is disposed in the inner receptacle space 18 of a housing-type joint body, which comprises a connecting piece 17a which possesses a socket-shaped depression, and a cap part 17b which closes the connecting piece and is sealed in relation to the latter by an annular seal 21. The connection between the cap part 17b and the connecting piece 17a is performed by screws 22.

The connection to the valve plate 1 takes place via the connecting piece 17a, as will be described in more detail below.

The connection of the valve rod 4 to the swivel head 16 is performed by means of a connecting screw 23 which penetrates a central through bore 24 through the swivel head 16 and is screwed into a threaded bore 25 on the front end of the valve rod 4. The valve rod here possesses a connecting portion 4a with an at least substantially square cross section, and the swivel head 16 possesses a depression 16a with a corresponding external contour into which the connecting portion 4a of the valve rod 4 protrudes so as to secure the valve rod against rotation relative to the swivel head.

To enable the connecting screw 23 to be screwed into the threaded bore 25 of the valve rod 4, the connecting piece 17a has a window opening 20 in the base.

The cap part 17b has a window opening 27 through which the valve rod 4 protrudes in the region of an end portion. In a central position of the connecting device, in which the valve plate 1 is aligned orthogonally to the longitudinal axis 26 of the valve rod 4 (i.e. the plane 14 in which the valve plate 1 lies is orthogonal to the longitudinal axis 26), there is an annular gap s between the valve rod 4 and the periphery of the window opening 27 in the cap part 17b. Proceeding from the central position, this enables (limited) pivoting of the valve plate 1 about an arbitrary axis orthogonal to the longitudinal axis 26 of the valve rod 4.

A first and a second joint socket part 35, 36 are disposed in the receptacle space 18 of the joint body 17a, 17b. The joint socket parts 35, 36 each possess a concave joint face 35a, 36a. This concave joint face 35a, 36a has in each case the shape of a spherical internal surface. The concave joint faces 35a, 36a of the joint socket parts 35, 36 are placed on the swivel head 16 from opposite sides and interact with respectively assigned convex joint faces 16b, 16c of the swivel head 16. The convex joint faces 16b, 16c are in each case configured in the form of a portion of a spherical surface and represent in each case a portion of the external surface of the swivel head 16.

The joint socket parts 35, 36 are pressed against the swivel head 16 by a spring-elastic element 37 in the form of a spring disk. The spring-elastic element 37 is screwed to the connecting piece 17a by means of screws 38. In the region adjoining the opening 37a, said spring-elastic element 37 has radial incisions and the segments severed from the incisions are bent upward. In this region, the spring-elastic element 37 bears on the second joint socket part 36 and presses it against the swivel head 16, whereby the swivel head 16 is pressed against the first joint socket part 35 which rests on a base at the base of the socket-shaped depression in the connecting piece 17a.

The swivel head is thus held by a friction-fit in the currently prevailing position. This friction-fit is so strong that, as a result, the weight of the valve plate 1 can also be absorbed without the position of the swivel head 16 changing, specifically independently of the spatial orientation of the closure device.

The opening 37a of the spring-elastic element 37 is larger than the window opening 27 of the cap part 17b. In this way, a seal ring 19 disposed on the swivel head 16 in a region surrounding the depression 16a can penetrate the opening 37a of the spring-elastic element 37 and be pressed against the inside of the cap part 17b in a region surrounding the window opening 27.

The swivel head 16 has projecting studs on mutually opposite sides. A respective stud 16d protrudes into a respectively assigned groove 17c in the connecting piece 17a. A respective one of the grooves 17c is formed in a wall delimiting the socket-shaped recess. In the central position of the connecting device, the grooves 17c run parallel to the longitudinal axis 26 of the valve rod 4.

As a result of the studs interacting with the grooves, the swivel head 16 is blocked in terms of rotating relative to the joint body about the longitudinal axis 26 of the valve rod 4. However, the swivel head 16 can be tilted about any arbitrary axis that is orthogonal to the longitudinal axis 26 of the valve rod 4 (until the annular gap s is used up).

The connecting device thus forms a ball-and-socket joint which is blocked in terms of rotation about an axis orthogonal to the equator plane of the swivel head 16, i.e. about the longitudinal axis 26 of the valve rod 4 connected to the swivel head.

A depression 29 is disposed in the projecting portion 1a on the rear side of the valve plate 1. The depression 29 emanates from the upper side of the projecting portion 1a, which is parallel to the plane 14 of the valve plate 1, and extends from this upper side in a direction orthogonal to the plane 14 of the valve plate 1. In the direction toward the front of the valve plate, the depression is delimited by a base of the depression.

In regions of two mutually opposite lateral walls of the depression 29, a respective extension 30 extends from the latter. The dimensions of the two extensions, measured in all directions parallel to the plane 14 in which the valve plate lies, are substantially smaller than, preferably less than half, the dimensions of the depression 29 (without these extensions) measured in the corresponding directions. The extensions 30 emanate from the depression 29 in opposite directions which are parallel to the longitudinal extent of the valve plate.

A threaded bore 31 opens out in each case on a lateral wall of a respective extension. In the exemplary embodiment, the threaded bores 31 are here parallel to the plane 14 of the valve plate and at an angle of 90° to the longitudinal extent of the valve plate. The end of the respective threaded bore 31 that lies opposite the opening into the respective extension 30 opens out on a lateral face of the projecting portion 1a.

On the side directed away from the valve rod 4, the connecting piece 17a has an appendage 17e which in the state connected to the valve plate 1 is inserted into the depression 29 of the valve plate 1. The appendage 17e thus protrudes into the depression 29 in a direction orthogonal to the plane 14 of the valve plate 1. This appendage 17e of the connecting piece 17a has a circumferential contour that deviates from the circular shape, and the depression 29 has a corresponding circumferential contour, as a result of which an anti-twist safeguard is formed between the connecting piece 17a and the valve plate 1 (in terms of an axis orthogonal to the plane of the valve plate).

There is a stepped surface 17d situated between the appendage 17e and the remaining part of the connecting piece 17a. In the state of the connecting piece 17a connected to the valve plate 1, this stepped surface 17d bears on the upper side of the projecting portion 1a of the valve plate 1. Disposed on the stepped surface 17d is an annular seal 33 which in the connected state with the valve plate 1 is pressed against a seal face 34 of the valve plate 1, said seal face 34 surrounding the depression 29 conjointly with the extensions 30 and being disposed on the upper side of the projecting portion 1a of the valve plate 1. The seal face 34 could also be disposed on the stepped surface 17d, and the annular seal 33 could also be disposed on the valve plate 1.

Pin-shaped connecting parts 32 protrude from the stepped surface 17d of the connecting piece 17a. For this purpose, in the exemplary embodiment, the connecting parts 32 have an external thread by way of which they are screwed into a respective threaded bore 40 in the connecting piece 17a.

Corresponding to the two extensions 30 present in the exemplary embodiment, there are thus two pin-shaped connecting parts 32 provided, one of which protrudes into one extension 30 and the other into the other extension 30 when the connecting piece 17a by way of its appendage 17e is inserted into the depression 29. The connecting parts, in a direction orthogonal to the plane 14 of the valve plate, protrude into the respective extension 30.

Retaining bolts 39 are screwed into the threaded bores 31. An end portion of the respective retaining bolt 39, the former thus being parallel to the plane 14 of the valve plate 1, protrudes from the respective threaded bore 31 into the region of the respective extension 30 and there into the groove 32a in the shank of the respective connecting part 32. The end portion of the respective retaining bolt 39 is configured without a thread and tapers conically towards its end. The grooves 32a of the connecting parts 32 have a corresponding form that tapers in cross section conically towards the bottom of the groove, cf. in particular FIG. 17. The lateral wall of the respective groove 32a, distal from the connecting piece 17a, thus forms a ramp which interacts with the end portion of the respective retaining bolt 39. Thus, when the retaining bolt is screwed in, with the end portion entering the groove 32a, the connecting piece 17a is pulled towards the valve plate 1, compressing the seal 33 and causing the stepped surface 17d of the connecting piece 17a to bear on the upper side of the projecting portion 1a of the valve plate 1.

A stable, rigid connection is thus formed between the valve plate 1 and the connecting piece 17a, which can be released in a simple manner by unscrewing the retaining bolts 39.

As a result of the receptacle space 18 of the joint body 17a, 17b being sealed by the seal 21 between the cap part 17b and the connecting piece 17a and by the seal ring 19 between the cap part 17b and the swivel head 16, and the depression 29 of the valve plate 1 being sealed in relation to the connecting piece 17a by the seal 33, particles which are created in particular during the movement of the swivel head 16 relative to the joint socket parts 35, 36 cannot make their way into the space surrounding the valve plate 1. The retaining bolts 39, preferably in the region of their heads, can also be expediently sealed in relation to the protruding section 1a of the valve plate 1 by means of seals. This can be seen in particular in FIG. 17 (the seals are not denoted).

Various modifications of the embodiment of the invention shown are conceivable and possible without departing from the scope of the invention as defined in the claims.

For instance, a connecting device that provides mobility between the valve plate 1 and the valve rod 4 could be dispensed with. A connecting piece could then be rigidly connected to the valve rod, for example screwed to the latter. The socket-shaped depression having the grooves could then be dispensed with, as could the seal 21 and the threaded bores for the screws 22, 38. On the side distal from the valve rod, such a connecting piece could be configured analogously to the connecting piece 17a shown in the figures. An integral configuration of the valve rod with such a connecting piece, for example by welding, is also conceivable and possible.

Instead of a protruding portion 1a, the valve plate 1 on the rear side could also have a transverse beam which in a central portion of the longitudinal extent thereof is unencumbered by a plate-shaped main body of the valve plate 1 and is connected to the main body of the valve plate only in the two end regions. The depression 29 would in this instance be disposed in the central portion of the longitudinal extent of the transverse beam of the valve plate. Such a transverse beam could be welded or screwed to the main body of the valve plate in the two end portions. In turn, the depression in the direction toward the front side of the valve plate would advantageously be delimited by a base, whereby an interior space of the depression may be sealed in relation to the surrounding space.

In a further potential modified configuration, it is conceivable and possible that the pin-shaped connecting parts 32 are dispensed with and instead the connecting piece 17a has an appendage of such a shape that this appendage projects not only into the depression 29 but also into the lateral extensions 30. In these regions projecting into the lateral extensions 30, the appendage could be provided with grooves with which the retaining bolts 39 interact, or a single groove could be provided annularly surrounding the extension, with the retaining bolts 39 interacting with a respective section of this groove. This appendage would thus form a single connecting part with at least one groove with which the end portion of a respective one of the retaining bolts interacts. In such a configuration, the connecting piece 17a could in turn be movably or rigidly connected to the valve rod, or be configured so as to be integral to the latter.

The depression 29 could also have more than two extensions into which the connecting part or a respective connecting part protrudes from the side of the valve rod, whereby end portions of retaining bolts protrude through the openings of the threaded bores into these extensions and engage in the at least one groove of the at least one connecting part.

LIST OF REFERENCE SIGNS

1 Valve plate
1a Projecting portion
2 Opening
3 Wall
4 Valve rod
4a Connecting portion
5 Drive
6 Bellows
8 Seal ring
9 Opening
10 Connector piece
11 Opening
12 Seal
13 Seal face
14 Plane
15 Connecting device
16 Swivel head
16a Depression
16b Joint face
16c Joint face
16d Stud
17a Connecting piece
17b Cap part
17c Groove
17d Stepped surface
18 Receptacle space
19 Seal ring
20 Window opening
21 Seal
22 Screw
23 Connecting screw
24 Through bore
25 Threaded bore
26 Longitudinal axis
27 Window opening
29 Depression
30 Extension
31 Threaded bore
32 Connecting part
32a Groove
33 Seal
34 Seal face
35 Joint socket part
35a Joint face
36 Joint socket part
36a Joint face
37 Spring-elastic element
37a Opening
38 Screw
39 Retaining bolt
40 Threaded bore

The invention claimed is:

1. A valve plate for a closure device for closing an opening in a wall in a vacuum-tight manner, the valve plate comprising:
a front side having a seal ring for sealing in relation to the wall located thereon;
a rear side having a depression adapted for connecting to a valve rod of the closure device;
the depression including two mutually opposite lateral walls, and at least in regions of the two mutually opposite lateral walls, an extension adjoins in each case the depression disposed on the rear side of the valve plate;
a respective threaded bore opens in the lateral wall of each respective one of the extensions such that the valve rod is connectable to the valve plate by a respective retaining bolt which is screwed into each of the respective threaded bores by an end portion that protrudes from the respective threaded bore into the respective extension, and by the end portion of the retaining bolt interacting with a groove disposed on a connecting part at an end of the valve rod.

2. The valve plate as claimed in claim 1, wherein the threaded bores extend parallel to a plane in which the valve plate lies.

3. The valve plate as claimed in claim 1, wherein the threaded bores are in each case disposed at an angle of more than 45° to a longitudinal extent of the valve plate.

4. The valve plate as claimed in claim 3, wherein the threaded bores are in each case disposed at an angle of 90° in relation to the longitudinal extent of the valve plate.

5. The valve plate as claimed in claim 1, wherein dimensions of the extensions in all directions parallel to the plane in which the valve plate lies are smaller than dimensions of the depression without said extensions in corresponding directions.

6. The valve plate as claimed in claim 1, wherein the extensions, proceeding from the depression in the valve plate, extend in directions away from one another and lie parallel to a longitudinal extent of the valve plate.

7. The valve plate as claimed in claim 1, further comprising a seal face or seal that surrounds the depression having the extensions for sealing between the valve plate and a connecting piece located at the end of the valve rod, and from which the at least one connecting part projects.

8. The valve plate as claimed in claim 1, wherein the depression having the extensions is disposed in a portion of the valve plate that projects on the rear side of the valve plate.

9. A closure device comprising;
a valve rod;
a valve plate for closing an opening in a wall in a vacuum-tight manner, the valve plate including:
a front side having a seal ring for sealing in relation to the wall located thereon;
a rear side having a depression connected to the valve rod;
the depression including two mutually opposite lateral walls, and at least in regions of the two mutually opposite lateral walls, an extension adjoins in each case the depression disposed on the rear side of the valve plate; and a respective threaded bore opens in the lateral wall of each respective one of the extensions for connection of the valve rod to the valve plate by a respective retaining bolt which is screwed into each of the respective threaded bores by an end portion that protrudes from the respective threaded bore into the respective extension, and by the end portion of the retaining bolt interacting with at least one groove disposed on a connecting part at an end of the valve rod; and the retaining bolts engage in the at least one groove disposed on the at least one connecting part.

10. The closure device as claimed in claim 9, further comprising a connecting piece releasably connected to the end of the valve rod or configured integral therewith, and the at least one connecting part projects from the connecting piece.

11. The closure device as claimed in claim 10 wherein the connecting piece has an appendage which protrudes into the depression of the valve plate and, by way of a circumferential contour that deviates from a circular shape and interacts with a corresponding circumferential contour of the depression, is secured against rotation in relation to the valve plate.

12. The closure device as claimed in claim 10, wherein the at least one groove, in which the end portions of the retaining bolts engage, has a ramp which interacts with a conically converging end portion of the respective retaining bolt, and upon the retaining bolts being connected to the at least one connecting part, the connecting piece is pressed against the valve plate.

13. The closure device as claimed in claim 10, wherein the connecting piece is sealed in relation to the valve plate by an annular seal in a region surrounding the depression having the extensions.

14. The closure device as claimed in claim 10, wherein a respective one of the connecting parts is present for a respective one of the extensions of the depression in the valve plate, each said connecting part has a shank that projects from the connecting piece and is surrounded in an annular manner by the respective groove into which the end portion of the respective retaining bolt protrudes.

15. The closure device as claimed in claim 10, wherein the connecting piece is movably connected to the valve rod.

* * * * *